United States Patent
Sun

(10) Patent No.: US 11,524,377 B2
(45) Date of Patent: Dec. 13, 2022

(54) LOCKABLE TOOL CLAMP

(71) Applicant: Chen Sound Industrial Co., Ltd., Taichung (TW)

(72) Inventor: Ying Sun, Taichung (TW)

(73) Assignee: CHEN SOUND INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 17/530,824

(22) Filed: Nov. 19, 2021

(65) Prior Publication Data
US 2022/0152761 A1 May 19, 2022

(30) Foreign Application Priority Data
Nov. 19, 2020 (TW) ................. 109140574

(51) Int. Cl.
*B23Q 3/157* (2006.01)
*B23Q 3/155* (2006.01)

(52) U.S. Cl.
CPC ...... *B23Q 3/15706* (2013.01); *B23Q 3/15539* (2016.11); *B23Q 3/15722* (2016.11);
(Continued)

(58) Field of Classification Search
CPC ......... Y10T 483/1882; Y10T 483/1873; Y10T 483/1809; Y10T 483/1845;
(Continued)

(56) References Cited

U.S. PATENT DOCUMENTS 4,151,918 A * 5/1979 Nakane ................ B23Q 3/1554
  483/44
4,783,902 A * 11/1988 Novak ............... B23Q 3/15546
  483/62
(Continued)

FOREIGN PATENT DOCUMENTS

CN    113894588 A  *  1/2022
SU      1065133 A  *  1/1984
(Continued)

OTHER PUBLICATIONS

Machine Translation of SU-1065133-A, which SU '133 was published Jan. 1984.*
(Continued)

*Primary Examiner* — Erica E Cadugan
(74) *Attorney, Agent, or Firm* — Muncy, Geissler, Olds & Lowe, P.C.

(57) ABSTRACT

A lockable tool clamp includes two jaw members and a pin together installed on a mount to clamp a tool holder securely. The jaw members each have a connecting portion and a jaw tip. The two connecting portions are overlapped and connected to the mount through a shaft. The pin when installed on the mount is parallel to the shaft, and passes through the two jaw members at a location different from where the shaft passes through the two jaw members. When the pin is in its unlocking position, the jaw members are allowed to pivot with respect to each other, so that the tool holder can be withdrawn or replaced by pushing the jaw tips apart. When the pin is in its locking position, the jaw members are restricted from pivoting with respect to each other. At this time, the tool holder is clamped between the jaw tips securely.

10 Claims, 9 Drawing Sheets

(52) U.S. Cl.
CPC .............. *B23Q 2003/15527* (2016.11); *Y10T 483/1795* (2015.01); *Y10T 483/1809* (2015.01); *Y10T 483/1845* (2015.01); *Y10T 483/1882* (2015.01)

(58) Field of Classification Search
CPC .......... Y10T 483/1975; B23Q 3/15722; B23Q 3/15526; B23Q 3/15553; B23Q 3/15706; B23Q 3/1554–2003/155456; Y10S 483/902
USPC .......................... 483/67, 66, 59, 63, 56, 902
See application file for complete search history.

(56) References Cited

U.S. PATENT DOCUMENTS

| | | | | |
|---|---|---|---|---|
| 4,873,756 A | * | 10/1989 | Yamane | B23Q 3/15534 408/35 |
| 4,879,802 A | * | 11/1989 | Winkler | B25J 15/0206 294/110.2 |
| 4,910,860 A | * | 3/1990 | Winkler | B23Q 3/15713 279/143 |
| 5,267,766 A | * | 12/1993 | Geissler | B23Q 3/1554 483/49 |
| 5,702,336 A | * | 12/1997 | Kameyama | B23Q 3/15706 483/902 |
| 7,115,082 B2 | * | 10/2006 | Prust | B23Q 5/58 483/902 |
| 2022/0152762 A1 | * | 5/2022 | Sun | B23Q 3/15722 |

FOREIGN PATENT DOCUMENTS

| | | |
|---|---|---|
| TW | 240497 | 2/1995 |
| TW | 324282 | 1/1998 |
| TW | I293907 B | 3/2008 |

OTHER PUBLICATIONS

Machine Translation of CN-113894588-A, which CN '588 was published Jan. 2022.*

* cited by examiner

LOCKABLE TOOL CLAMP

BACKGROUND OF THE INVENTION

1. Field of the Invention

The present invention relates to a tool clamp for clamping a tool holder used with a machine tool, and more particularly to a lockable tool clamp.

2. Description of the Related Art

For facilitating tool-changing operation during a process of a machining center, there is usually a mating tool magazine provided. Common types of tool magazines include the carousel type, the turntable type, the chain type, and the tool-bin type for meeting needs of different processing methods and tools. A tool magazine is a device that stores various processing tools for machining center to selectively use to machine workpieces, and has become an indispensable accessory for a machining center. Therefore, the enthusiasm for designs and innovations focused on tool magazines in the industry is never less than that for the machining center themselves.

Among existing tool clamp structures, one example is the tool-clamping mechanism of a drum-type tool magazine disclosed in Taiwan Patent No. 240497, which uses propping pins located at two inside sides of the front edge of the pressing plate to prop up the pushing-pulling surface of the clamped tool, so as to prevent the tool from being ejected from the tool magazine due to high-speed rotation of the tool disc. As another example, Taiwan Patent No. 324282 discloses a clamping holder structure of a tool padding in a machining center, which has two jaw members terminally equipped with respective returning members. With the springiness of the returning members, the jaw members pivot inward against a round rod, so that two clamping edges of the jaw members can jointly hold the neck tool to be machined in position. A further example is Taiwan Patent No. 1293907, which discloses a cutter set structure that has a retaining block accommodated in a clamping portion. The retaining block is configured to engage with an annular groove formed peripherally on a tool holder loaded thereon, so as to secure the tool holder in a tool-clamping seat.

However, in practical use, a clamped tool holder can sometimes come off the tool clamp when receiving unexpected external force and cause danger. While theses known tool clamp structures have their respective clamping structures for holding a tool holder in position (i.e., the propping pins, the returning members, and the retaining blocks), none of which provides a solution that prevents unintentional opening of the tool clamp. Hence, there is a need to improve the prior-art device by equipping a tool clamp with a secure tool-locking mechanism.

SUMMARY OF THE INVENTION

To meet the aforementioned need, the present invention provides a lockable tool clamp that implement a secure tool-locking mechanism, so as to ensure that a tool holder can never be withdrawn or replaced unless the tool clamp is in an unlocked state.

One embodiment of the present invention provides a lockable tool clamp, which is installed on a mount for clamping a tool holder. The tool clamp comprises two jaw members and a pin. Each of the jaw members has a connecting portion and a jaw tip. The two connecting portions are overlapped and are pivotally connected to the mount through a shaft passing through the two connecting portions. The two jaw tips are drawn together or pulled apart as the two connecting portions pivot with respect to each other. The pin when installed on the mount is parallel to the shaft, and the pin passes through the two connecting portions at a location different from where the shaft passes through the two connecting portions. The pin is axially movable with respect to the mount between an unlocking position and a locking position. When the pin is in the unlocking position, the two jaw members are allowed to pivot with respect to each other, thereby allowing the tool holder to be withdrawn or replaced by pushing the two jaw tips apart. When the pin is in the locking position, the two jaw members are restricted from pivoting with respect to each other, so the tool holder is clamped securely between the two jaw tips.

Thereby, only when the pin is in the unlocking position, can the tool holder push apart the two jaw tips and get withdrawn from the tool clamp or replaced into the tool clamp. When the pin is in the locking position, the two jaw members are restricted from pivoting with respect to each other. At this time, the two jaw members restricted by the pin jointly prevent the two jaw tips from being pushed apart. This means that even if the tool holder receives an unexpected force, the tool holder is secured in the tool clamp, thereby realizing the desired secure tool-locking mechanism that effectively prevents the tool holder from coming off the tool clamp unintentionally.

DETAILED DESCRIPTION OF THE INVENTION

While a preferred embodiment provided hereinafter for illustrating the concept of the present invention has been described above, it is to be understood that the components of the embodiment shown in the accompanying drawings are depicted with scale, dimensions, deformation and/or displacement facilitating easy explanation and need not to be made to exact scale.

Figure 1:
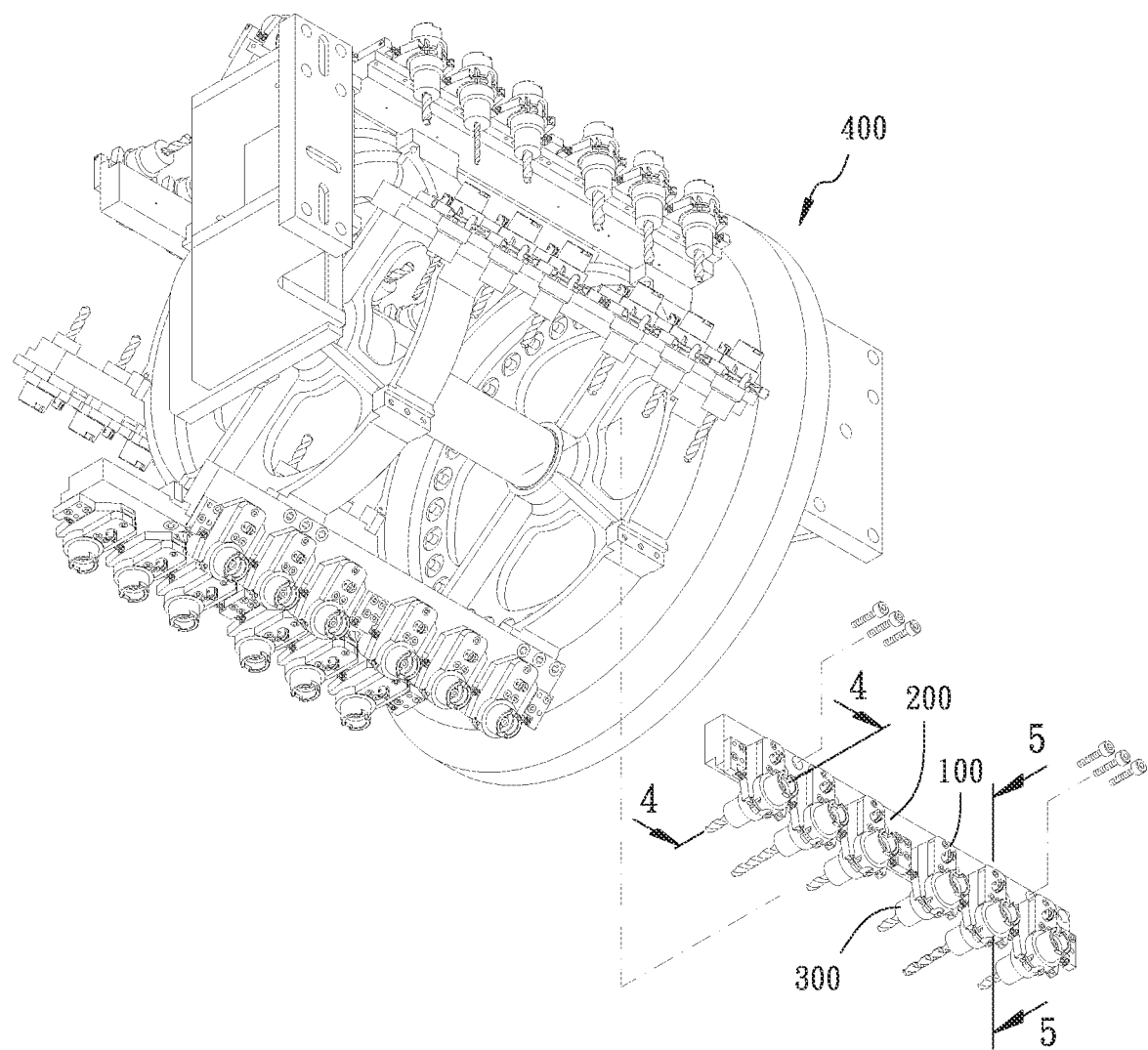
FIG. 1 is an applied view of tool clamps according to one embodiment of the present invention installed on a drum-type tool magazine together with a mount.
Figure 2:
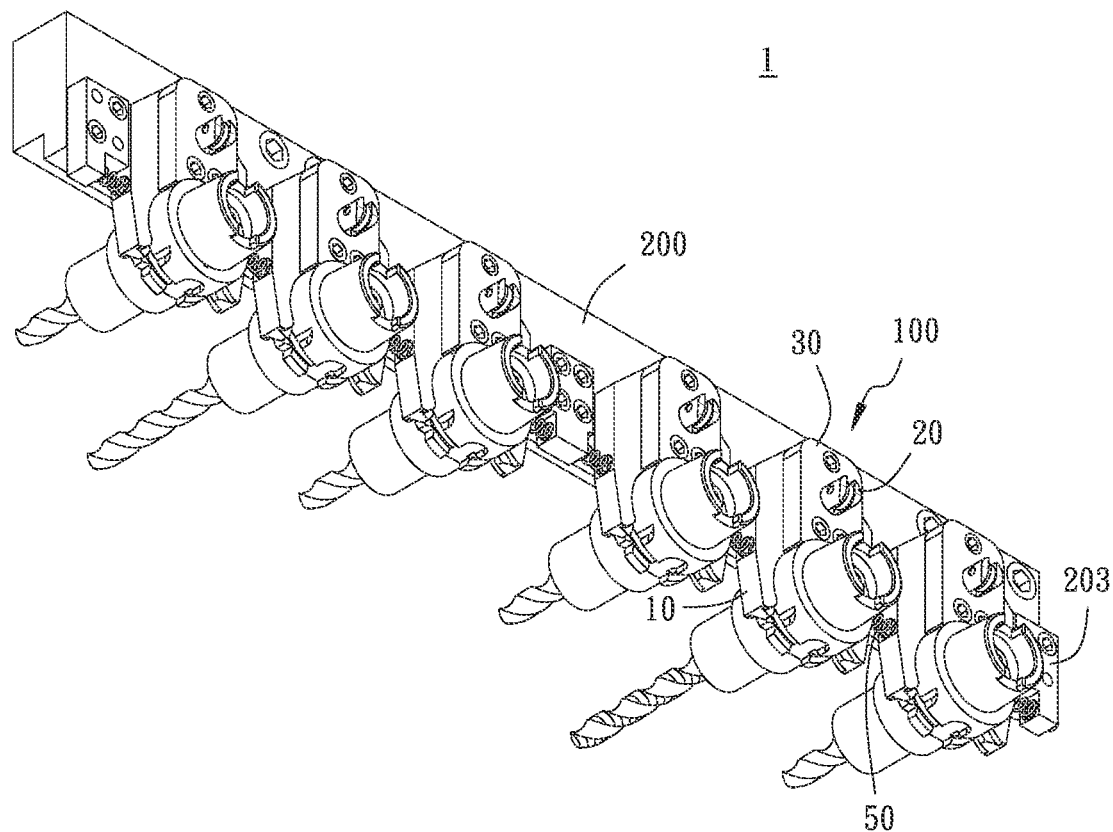
FIG. 2 is a perspective view of the tool clamps on the mount according to the embodiment of the present invention.

Referring to FIG. 1 through FIG. 9, the present invention provides a lockable tool clamp 100, which is installed on a mount 200 to clamp a tool holder 300. In the depicted embodiment, the mount 200 is equipped with plural tool clamps 100 that are arranged abreast, as shown in FIG. 1 and FIG. 2. The tool clamp 100 primarily comprises two jaw members 10 and a pin 20, which will be detailed below.

Figure 3:
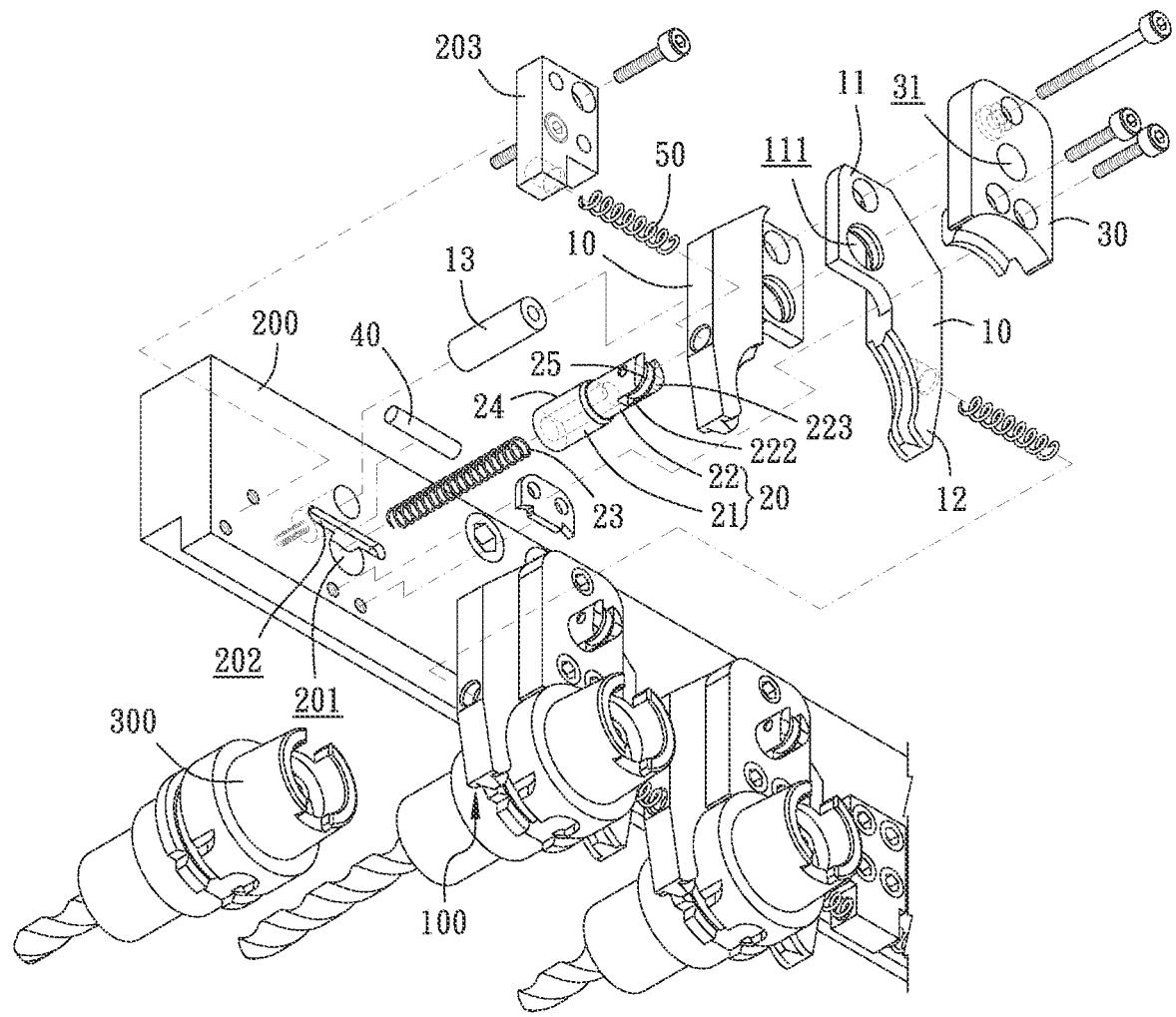
FIG. 3 is an exploded view of the tool clamps on the mount according to FIG. 2.

The jaw members 10 each have a connecting portion 11 and a jaw tip 12. The two connecting portions 11 are overlapped and passed through by a shaft 13 so that they are pivotably connected to the mount 200. The two jaw tips 12 are drawn together or pulled apart from each other as the two connecting portions 11 pivot with respect to each other. In the present embodiment, the two jaw members 10 are of the same structure. The connecting portion 11 is a side plate thinner than the trunk of the jaw member 10. In the present embodiment, the two jaw members 10 are arranged in opposite directions so that when the two jaw members 10 are assembled, the two connecting portions 11 are overlapped with each other, as shown in FIG. 3, thereby making the two jaw tips 12 located symmetrically. In addition, the two connecting portions 11 each have a pin hole 111. The two pin holes 111 are of the same diameter. The two pin holes 111 are aligned with each other when the two connecting portions 11 are overlapped.

Figure 4:
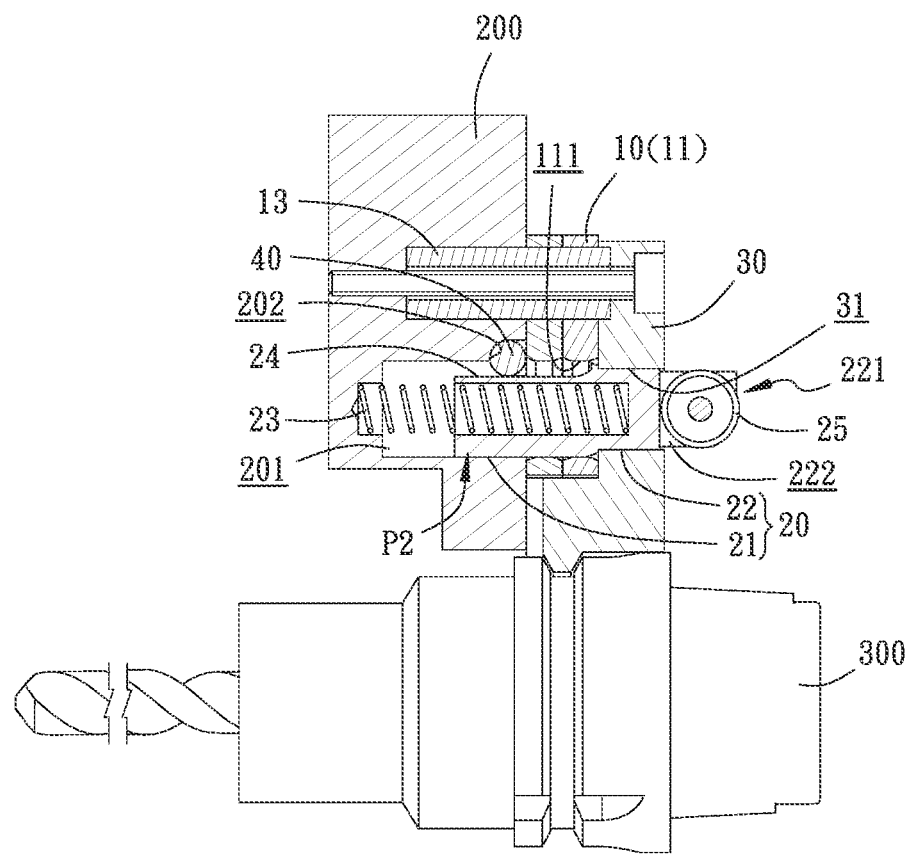
FIG. 4 is a cross-sectional view of the tool clamp taken along Line 4-4 of FIG. 1, wherein a pin is in its locking position.
Figure 5:
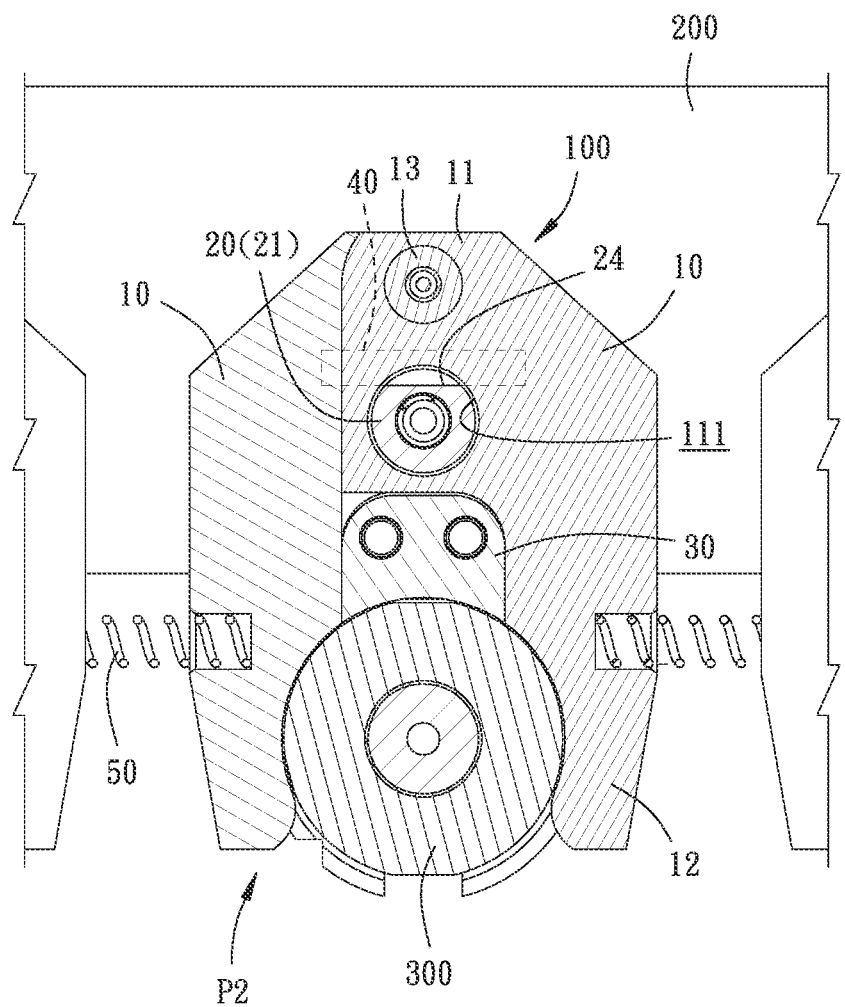
FIG. 5 is a cross-sectional view of the tool clamp taken along Line 5-5 of FIG. 1.
Figure 7:
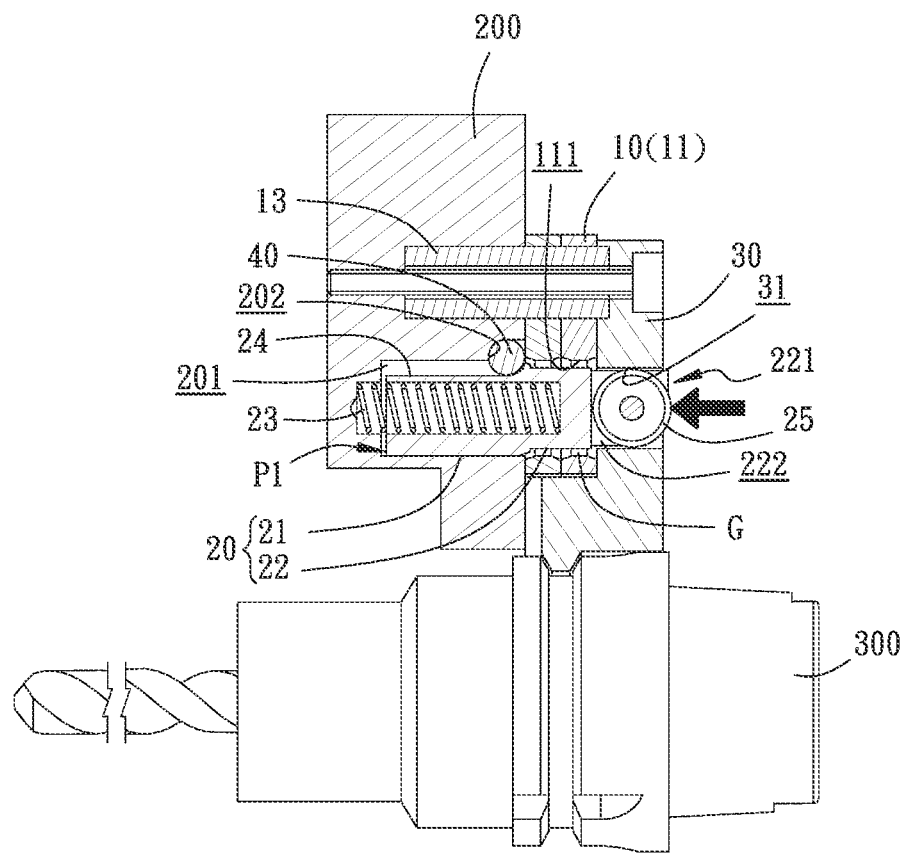
FIG. 7 is a schematic drawing illustrating that the pin of FIG. 4 moves axially to its unlocking position.
Figure 8:
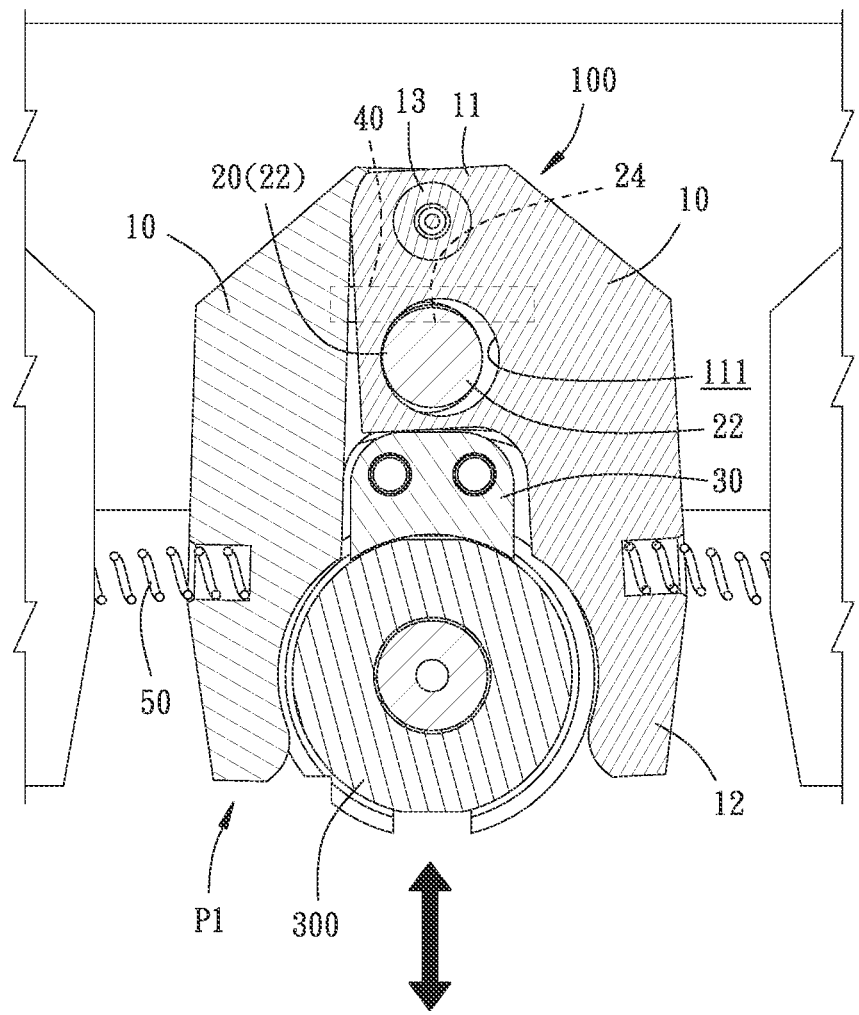
FIG. 8 is a schematic drawing illustrating that when the pin is in the unlocking position, two jaw members of FIG. 5 have their jaw tips being pushed apart by the tool holder that is withdrawn from or replaced into the tool clamp.

The pin 20 when installed on the mount 200 is parallel to the shaft 13 and is located on the mount 200 differently from the shaft 13. The pin 20 passes through the two aligned pin holes 111 in such a way that the pin 20 is allowed to move axially with respect to the mount 200 between an unlocking position P1 (as shown in FIG. 7 and FIG. 8) and a locking position P2 (as shown in FIG. 4 and FIG. 5). When the pin 20 is in the unlocking position P1, the two jaw members 10 are allowed to pivot with respect to each other. When the tool holder 300 is connected to and moves with a machining spindle, the tool holder 300 exerts a force between the two jaw tips 12 and pushes apart the two jaw tips 12, so that the tool holder 300 can be withdrawn from the tool clamp 100, or be replaced into the tool clamp 100. When the pin 20 is in the locking position P2, the two jaw members 10 are restricted by the pin 20 from pivoting with respect to each other. At this time, the tool holder 300 is clamped by the two jaw tips 12 in position, Herein, the two jaw members 10 may pivot with respect to each other, in which case both of the jaw members 10 are pivotable. Alternatively, one of the jaw members 10 is made immovable while the other is movable with respect to the immovable one jaw member 10. In either case, the two jaw members 10 can pivot with respect to each other as conceived by the present invention.

In the present embodiment, the pin 20 has large-diameter section 21 and a small-diameter section 22. The large-diameter section 21 has a diameter approximately equal to the diameter of the two pin holes 111. The small-diameter section 22 has a diameter smaller than the diameter of the two pin holes 111. When the pin 20 is in the locking position P2, the large-diameter section 21 is closely fit in the two pin holes 111 to restrict the two jaw members 10 from pivoting with respect to each other. When the pin 20 is in the unlocking position P1, the small-diameter section 22 is loosely received in the pin holes 111 and thus it can be separated from at least a part of the wall of each of the pin holes 111 by a gap G. The gap G provides the room for the two jaw members 10 to pivot with respect to each other.

Preferably, the mount 200 has a pin slot 201 for accommodating the pin 20. The pin slot 201 receives therein a return spring member 23. The return spring member 23 in the present embodiment may be a compression spring. The pin 20 in the pin slot 201 has its large-diameter section 21 abutted by the return spring member 23, so that the pin 20 is normally pushed by the return spring member 23 toward the locking position P2. When the pin 20 moves to the unlocking position P1, the return spring member 23 is compressed and generates a pre-force, After the force compressing the return spring member 23 disappears, the pre-force makes the pin 20 return to the locking position P2.

In the present embodiment, there is further a positioning base 30 fastened to the mount 200, as shown in FIG. 2 and FIG. 3. The positioning base 30 is stacked on the two connecting portions 11. Between the positioning base 30 and the mount 200, there is a room for the two jaw members 10 to pivot. Therein, the positioning base 30 has a through hole 31. When the positioning base 30 is fastened to the mount 200, this through hole 31 is aligned with the two pin holes 111. The through hole 31 and the small-diameter section 22 have the same diameter. When the pin 20 is in the locking position P2, the large-diameter section 21. is closely fit in the two pin. holes 111, while the small-diameter section 22 is closely fit in the through hole 31. The small-diameter section 22 now leaves an exposed section 221. outside the through hole 31. When the exposed section 221 is perished into the through hole 31, the pin 20 moves from the locking position P2 to the unlocking position P1.

In the present embodiment, the pin 20 has a side near the large-diameter section 21 formed with a tangent plane 24, as shown in FIG. 3, FIG. 4, and FIG. 5. This tangent plane 24 is formed as the side of the large-diameter section 21 of the pin 20 is radially recessed to form a plane that axially extends. A retainer 40 is installed on the mount 200 to be next to the pin slot 201 and press on the tangent plane 24. The retainer 40 as used in the present embodiment has a column body. The mount 200 has a recess 202 to receive and position the retainer 40. When the pin 20 moves axially with respect to the mount 200, the retainer 40 restricts the pin 20 from deflecting.

Accordingly, when the pin 20 is in the unlocking position P1, the small-diameter section 22 and the wall of the pin hole 111 of the upper jaw member 10 are separated by the gap G (as shown in FIG. 7), so the upper jaw member 10 has a pivoting range greater than that of the lower jaw member 10, but the present invention is not limited thereto. In other words, the small-diameter section 22 may be separated from at least a part of the wall of each of the pin holes 111 of the both jaw members 10 by the gap G (not shown), so that the two jaw members 10 have the same pivoting range.

In the present embodiment, the pin 20 has a notch 222. The notch 222 is located in the exposed section 221, A roller 25 is rotatably installed on the exposed section 221 and received in the notch 222. Moreover, the pin 20 has a chamfer cut 223 located atop the exposed section 221. The chamfer cut 223 has a side facing the notch 222 formed with a curved profile. The roller 25 is exposed atop a side of the pin 20 near the chamfer cut 223. Thereby, when the roller 25 is pushed, the exposed section 221 is in turn pushed into the through hole 31.

In the present embodiment, each of the jaw members 10 has its outer side abutted by a further return spring member 50. The further return spring member 50 in the present embodiment may be a compression spring. When the two jaw members 10 pivot with respect to each other, the jaw members 10 pivoting outward compress the respective further return spring members 50. Later when the further return spring member 50 is released, the further return spring member 50 drives the jaw member 10 to pivot back. Herein, some of the further return spring members 50 are provided.

between two adjacent tool clamps 100. These further return spring members 50 each have their two ends abutting between the opposite jaw members 10 of the adjacent tool clamps 100. As shown in FIG. 2, some of the further return spring member 50 may have a single end abutting against the jaw member 10 of the respective tool clamp 100, and have the other end abutting against a stopper 203 provided on the mount 200. In the present embodiment, there are three stoppers 203 provided on the mount 200. Two of them are located at the outer sides of the two lateral most tool clamps 100 on the mount 200. The remaining one stopper 203 is located at the middle of the mount 200. In the present embodiment, in virtue of the stoppers 203, the further return spring members 50 can make the pivoting away jaw members 10 of the tool clamps 100 pivot back.

Figure 6:
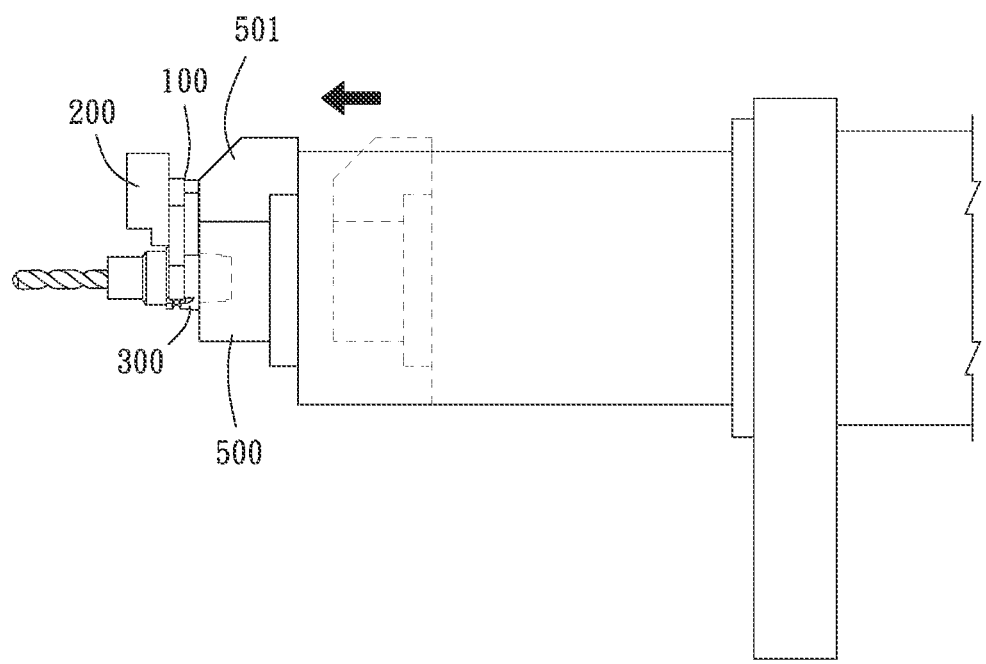
FIG. 6 is a schematic drawing illustrating that a spindle moves toward the tool clamp to a location where it picks up a tool holder according to the embodiment.
Figure 9:
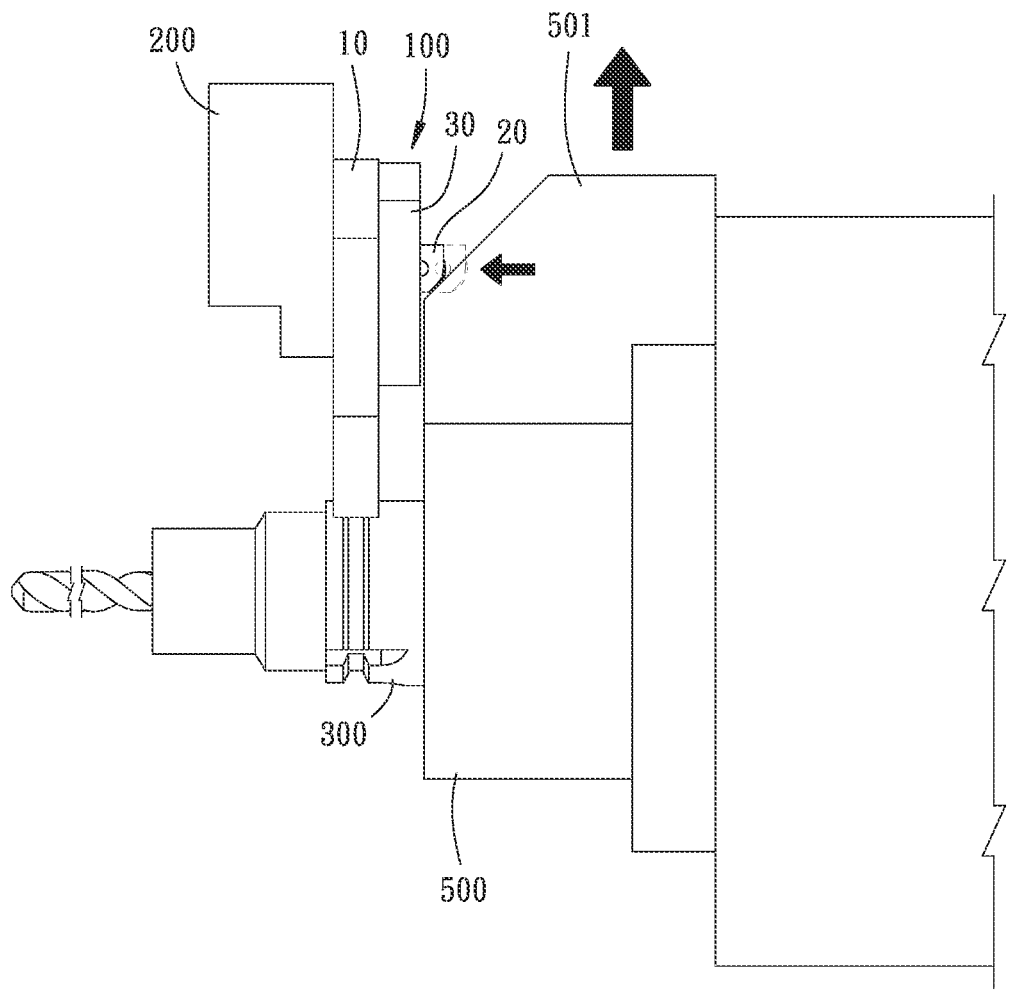
FIG. 9 is a schematic drawing illustrating that the spindle takes the tool holder back to the tool clamp according to the embodiment.

In use, the tool clamp 100 and the mount 200 as described previously are installed on a drum-type tool magazine 400 as shown in FIG. 1. Assuming that a tool holder 300 currently clamped by the tool clamp 100 is about to be released, an operator can move a machining spindle 500 connected to the tool holder 300 to make a pressing member 501 of the machining spindle 500 come into contact with the exposed section 221 and abut against the roller 25, as shown in FIG. 6 and FIG. 7. As a result, the exposed section 221 is pushed in to the through hole 31 so that the pin 20 comes to the unlocking position P1. At this time, in virtue of the gap G existing between the small-diameter section 22 and the wall of the pin hole 111, the jaw members 10 can pivot to pull the two jaw tips 12 apart. Then the tool holder 300 can move with the machining spindle 500 and get withdrawn from the tool clamp 100. For replacing the tool holder 300 back to the tool clamp 100, the machining spindle 500 takes the pressing member 501 to move along the chamfer cut 223 until the pressing member 501 comes into contact with the exposed section 221 and abuts against the roller 25, as shown in FIG. 9. This also causes the exposed section 221 to be pushed into the through hole 31 and moves the pin 20 to the unlocking position P1, where the two jaw tips 12 are pulled apart. Then. the tool holder 300 can move with the machining spindle 500 and return to the tool clamp 100.

After the tool holder 300 is replaced or withdrawn, the pin 20 is in the locking position P2 because it is normally pushed by the return spring member 23. Thus, the large-diameter section 21 is closely fit in the two pin holes 111 since their diameters are approximately equal. This prevents the two jaw members 10 from pivoting with respect to each other. As a result, a tool holder 300 now in the tool clamp 100 can be held securely by the two jaw tips 12. Unless the pin 20 moves to the unlocking position P1 again, the tool holder 300 can never be taken out from the two jaw tips hereby securing the tool holder 300 in the tool clamp 100.

As can be learned from the description above, the tool clamp 100 of the present invention features a secure tool-locking mechanism. This means that only when the pin 20 is in the unlocking position P1, can the tool holder 300 push apart the two jaw tips 12 and get withdrawn from the tool clamp 100 or replaced into the tool clamp 100. When the pin 20 is in the locking position P2, the two jaw members 10 are restricted from pivoting with respect to each other. At this time, the two jaw members 10 restricted by the pin 20 jointly prevent the two jaw tips 12 from being pushed apart. This means that even if the tool holder 300 receives an unexpected force, the tool holder is secured in the tool clamp 100, thereby realizing the desired secure tool-locking mechanism that effectively prevents the tool holder 300 from coming off the tool clamp 100 unintentionally.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A lockable tool clamp for clamping a tool holder, the lockable tool clamp being installed on a mount, the tool clamp comprising:

two jaw members, each of the jaw members having a respective connecting portion and a respective jaw tip, wherein the two connecting portions are overlapped with each other in a direction of a pivot axis of the jaw members, and the two connecting portions are pivotably connected to the mount by a common shaft that passes through the two jaw members, and the jaw tips are drawn together or pulled apart when the two connecting portions pivot with respect to each other; and a pin, when installed on the mount, having a longitudinal axis that is parallel to a longitudinal axis of the shaft, and passing through the two connecting portions at a location different from where the shaft passes through the two connecting portions, wherein the pin is axially movable with respect to the mount between an unlocking position and a locking position, so that when the pin is in the unlocking position, the two jaw members are allowed to pivot with respect to each other, thereby allowing the tool holder to be withdrawn or replaced by pushing the two jaw tips apart; and when the pin is in the locking position, the two jaw members are restricted from pivoting with respect to each other, so the tool holder is clamped securely between the two jaw tips.

2. The lockable tool clamp of claim 1, wherein the two connecting portions each have a respective pin hole, wherein the two pin holes are of an identical diameter and are aligned with each other when the two connecting portions are overlapped so that the pin can pass through the two pin holes, and the pin has a larger-diameter section that has a diameter approximately equal to the diameter of the two pin holes and a smaller-diameter section that has a diameter smaller than the diameter of the two pin holes, whereby when the pin is in the locking position, the larger-diameter section is fit in the two pin holes so as to restrict the two jaw members from pivoting with respect to each other; and when the pin is in the unlocking position, the smaller-diameter section is received in the pin holes and separated from at least a part of a wall of each of the pin holes by a gap that allows the two jaw members to pivot with respect to each other.

3. The lockable tool clamp of claim 2, wherein the mount has a pin slot for such accommodating the pin such that the pin abuts against a return spring member in the pin slot and the pin is normally pushed toward the locking position by the return spring member, so that when the pin moves to the unlocking position, the return spring member is compressed to generate a pre-force, which later returns the pin to the locking position.

4. The lockable tool clamp of claim 3, further comprising a positioning base that is fastened to the mount and stacked on the two connecting portions, wherein the positioning base is formed with a through hole that is aligned with the two pin holes and that has a diameter equal to the diameter of the smaller-diameter section, whereby when the pin is in the locking position, the larger-diameter section is fit in the two pin holes, and the smaller-diameter section is fit in the through hole and leaves an exposed section outside, and when the exposed section is pushed into the through hole, the pin moves from the locking position to the unlocking position.

5. The lockable tool clamp of claim 4, wherein the pin has a notch located in the exposed section, and a roller is rotatably installed on the exposed section and received in the notch, so that when the roller is pushed, the exposed section is in turn pushed into the through hole.

6. The lockable tool clamp of claim 5, wherein the pin has a chamfer cut located atop the exposed section, and the chamfer cut has a side facing the notch and is formed with a curved profile, so that the roller is exposed atop a side of the pin.

7. The lockable tool clamp of claim 3, wherein the pin has a side at the larger-diameter section radially recessed with respect to the longitudinal axis of the pin to form a tangent plane that extends in the axial direction with respect to the longitudinal axis of the pin, and a retainer is installed on the mount to be next to the pin slot and press on the tangent plane, whereby the pin is restricted by the retainer from deflecting when the pin moves axially, in the direction of the longitudinal axis of the pin, with respect to the mount.

8. The lockable tool clamp of claim 1, wherein in addition to the tool clamp, the mount has at least one additional tool clamp, such that all of the tool clamps are arranged abreast.

9. A tool mount system, comprising:
a mount;
a plurality of lockable tool clamps arranged abreast, each of the lockable tool clamps being configured for clamping a respective tool holder, each of the lockable clamps comprises a respective two jaw members, each of the jaw members having a respective connecting portion and a respective jaw tip,
wherein the two connecting portions of each of the tool clamps are overlapped with each other in a direction of a corresponding pivot axis of the corresponding two jaw members, and the corresponding two connecting portions are pivotably connected to the mount by a corresponding common shaft that passes through the two jaw members, and the jaw tips of each of the tool clamps are drawn together or pulled apart when the corresponding two connecting portions pivot with respect to each other,
wherein each of the tool clamps includes a respective pin,
wherein for each of the tool clamps, when the pin thereof is installed on the mount, a corresponding longitudinal axis of the corresponding pin is parallel to a corresponding longitudinal axis of the corresponding shaft and the pin passes through the corresponding two connecting portions at a location different from where the corresponding shaft passes through the corresponding two connecting portions,
wherein each of the pins is axially movable, in the direction of the longitudinal axis of the corresponding pin, with respect to the mount between a respective unlocking position and a respective locking position, so that when the corresponding pin is in the corresponding unlocking position, the corresponding two jaw members are allowed to pivot with respect to each other, thereby allowing the corresponding tool holder to be withdrawn or replaced by pushing the corresponding two jaw tips apart; and when the corresponding pin is in the corresponding locking position, the corresponding two jaw members are restricted from pivoting with respect to each other, so the corresponding tool holder is clamped securely between the corresponding two jaw tips, and
wherein each of the jaw members has a respective outer side abutted by a respective return spring member, so that when at least one of the jaw members pivots outward, the corresponding return spring member is compressed, and later when the return spring member is released, the return spring member drives the at least one jaw member to pivot back.

10. The tool mount system of claim 9, wherein any said return spring member that is located between two adjacent ones of said tool clamps has a corresponding two ends thereof abutting against the opposite said jaw members of the two adjacent tool clamps, respectively, and any said return spring member that is not located between two adjacent ones of said tool clamps has only one end abutting against one of the jaw members of a said tool clamp and has its opposite return spring member end abutting against a corresponding stopper installed on the mount.

* * * * *